United States Patent [19]
Stoy et al.

[11] Patent Number: 5,159,360
[45] Date of Patent: Oct. 27, 1992

[54] CONTACT LENS WITH PRE-DETERMINED USEFUL LIFE

[75] Inventors: Vladimir A. Stoy, Borough of Princeton; Jan Lovy, Plainsboro Twp., Middlesex Cty.; George P. Stoy, South Brunswick Twp., Middlesex Cty., all of N.J.

[73] Assignee: Kingston Technologies, Inc., Dayton, N.J.

[21] Appl. No.: 556,329

[22] Filed: Jul. 17, 1990

[51] Int. Cl.$^5$ .................................................. G02C 7/04
[52] U.S. Cl. .................................. 351/160 H; 351/177
[58] Field of Search ............... 351/160 H, 160 R, 161, 351/162, 177

[56] References Cited
U.S. PATENT DOCUMENTS 3,220,960  11/1965  Wichterle et al. ............... 351/160 H
4,163,609  8/1979  Neefe ............................. 351/160 R Primary Examiner—Scott J. Sugarman
Attorney, Agent, or Firm—Kenneth P. Glynn

[57] ABSTRACT

The present invention contact lens is a soft, disposable lens which, under eye wearer conditions, changes one or more characteristics essential for comfortable use, at a predetermined time to initiate disposal thereof by the user. This lens, under wear conditions, changes, for example, at least its base curve redius and its deformability as a consequence of a change in hydrophilicity of at least a portion of the contact lens material. This hydrophilicity change may be achieved by various means, e.g. degradation of crosslinking bridges or conversion of less hydrophilic groups to groups having greater hydrophilicity. In one preferred embodiment, the conversion is achieved by hydrolysis of selected functional (hydrophobic) groups into hydrophilic groups.

47 Claims, 2 Drawing Sheets

CONTACT LENS WITH PRE-DETERMINED USEFUL LIFE

BACKGROUND OF THE INVENTION

1. Field of the Invention

The present invention is directed to contact lenses and more particularly to lenses made of synthetic polymer material having specific characteristic capabilities. These include the ability to begin change while in use and, in a predetermined period of time, the ability to have the change translated into a recognizable signal to dispose of or otherwise replace the lenses.

2. Prior Art Statement

Current contact lenses are sophisticated despite their small size and apparent simplicity. Most lenses have been designed for long term intimate contact with living tissue (namely, the cornea), and, as a result, the requirements for edge and surface quality are extremely high. The surface quality of a lens may be compromised by deposits of foreign matter; by scratches from handling; by cracks from environmental stress; by embedded particles, such as dust specks; by colonies of microorganisms and their residuals; and by combinations of these, as well as other detrimental factors. Contact lenses are generally maintained by cleaning and disinfection procedures which help to maintain their quality but which may also cause another kind of deterioration. The current lenses have to be cleaned, disinfected and maintained by the individual user. The errors or neglect in the cleaning procedures not only deteriorate the lens quality, but may also create a direct hazard to the eye. The cumulative effect of the time induced deterioration and deviations from optimum cleaning procedures are increased health risk and decreased benefit to the user.

Therefore, contact lenses can be functionally better and safer when used as disposable items to be discarded after performing their function for an optimum period of time. In other words, for the good of the user's health, as well as simplicity of use, total elimination of cleaning procedures by the user is preferred. Motivated by both health considerations and convenience considerations for their customers, manufacturers have developed and marketed certain types of contact lenses as disposable goods.

One problem with the current disposable lenses is that they are functionally indistinguishable from much more expensive contact lenses sold as permanent or "use until destroyed" devices. The current coexistence of two very differently priced versions of what appears to the user to be the same device poses certain risks of error or misuse. This would be not only detrimental to trade, but ultimately could increase the risk to the user.

To avoid this confusion and risk, it is desirable that the disposable lens differ from the repeated-use lens in such a way that the former type cannot be misused as the lens for repeated or permanent use. This difference cannot be one of safety or efficacy or comfort of the lens during the initial use, or it would not be a viable product.

Instead, the present invention is directed to the use of a "self-destruct" feature, promoting the use as a disposable item and preventing or discouraging the misuse. In other words, lens properties (such as wear comfort, vision quality, appearance etc.) should change after a certain period of time to encourage the user to replace his or her lenses, without complicating the functioning of the lenses or confusing the user.

The present invention is based on this unsatisfied need and is neither taught nor suggested by the current state of the art.

BRIEF SUMMARY OF THE INVENTION

The present invention contact lens is a soft, disposable lens which, under eye wearer conditions, changes one or more characteristics essential for comfortable use, at a predetermined time to initiate disposal thereof by the user. This lens, under wear conditions, changes, for example, at least its base curve radius and its deformability as a consequence of a change in hydrophilicity of at least a portion of the contact lens material. This hydrophilicity change may be achieved by various means, e.g. degradation of crosslinking bridges or conversion of less hydrophilic groups to groups having greater hydrophilicity or vice versa. In one preferred embodiment, the conversion is achieved by hydrolysis of selected functional (hydrophobic) groups into hydrophilic groups.

BRIEF DESCRIPTION OF THE DRAWINGS

The present invention may now be more fully understood when the present disclosure is taken in conjunction with the drawings appended hereto, wherein.

DETAILED DESCRIPTION OF THE INVENTION

As mentioned above, the present invention is directed to a contact lens which undergoes a change during use which causes the wearer to dispose of it and replace it with a fresh lens. In other words, a primary objective of the present invention is to promote disposability of a disposable contact lens at the appropriate time.

In considering this problem, it is recognized that there are various changes in lens characteristics which can be conceivably used to promote disposability. Examples are: change of color; development of opacity; increase of lens rigidity; excessive protein deposits; dramatic deterioration of mechanical properties; increasing chance of incidental destruction, and so on. However, not all time-dependent lens characteristics are equally suitable for the task. Some may increase the hazard to the user (such as protein depositions) while others may not provide sufficient incentive to dispose the lens (such as color change).

The time-dependent changes may preferably be caused by various factors which provide the impulse for the change and initiate the "trigger" or "timer" mechanism of the lens. Thus, the system must have an impulse which would function like the start of a clock or stopwatch. This impulse has to be something which "recognizes" the beginning of the wear period (i.e. something that changes distinctly between the conditions during the manufacture, storage, and distribution on one hand and conditions during the actual use on the other). Such changes may be actinic light, presence of oxygen (providing that the light and/or oxygen were excluded prior to actual use), presence of proteins or enzymes or other natural components of tears and so on. In addition, in order to achieve the predictability of the length of the wear period, the impulse should be well defined and preferably relatively constant under a wide range of conditions (patient to patient, location to location, season to season, etc.)

The mechanism converting the impulse into the change in lens characteristic(s) should be well predictable and should not induce any health hazard (for instance, release of toxic by-products). Examples of such mechanism may be photodepolymerization of lens material or oxidation of a leukoform of a dye embedded in the lens. Again, many mechanisms connecting various impulses into various changes can be speculated upon, but not all of them are equally suitable or desirable.

The lens with the self-destruct characteristics should be combined with suitable packaging and other means for sterilization, maintenance distribution, etc. to provide safety, efficacy, convenience and economy for consumers. These all together (lens proper, package, storage solution, etc.) form a desirable disposable lens system.

Although many impulse-mechanism-change combinations are theoretically conceivable, no such disposable lens system was actually developed prior to the present invention. Some of the developmental lenses actually turned out to be unstable during the long term use, but the length of stability was not predictable nor preset. Further, there was no successful effort to utilize such instability for triggering disposability for a predetermined useful life. One example is collagen lenses which are enzymatically unstable in the eye and appear to be one of the candidates for a disposable lens. However, there are various problems with collagen (and similarly biodegradable) lenses. First of all, the bulk enzymatic degradation has character of erosion rather than a gradual change of properties. Secondly, the rate of degradation is strongly dependent on activity of individual enzymatic systems, thus unpredictable. Thirdly, the stimulation of enzymatic or immunological systems by peptidic polymers may cause an adverse reaction. The other reasons for this lack of the obviously desirable product may be not only limitations on practical function of the self-destructing mechanism, but also very strict requirements on the lens quality, shelf stability, reproducibility and manufacturing economy for this kind of product.

The lens according to our invention avoids these shortcomings and is a soft contact lens which, under wear conditions, changes at least its base-curve radius and its deformability as a consequence of change in hydrophilicity of at least one part of the contact lens material. This change in hydrophilicity is preferentially increased which may be achieved by various means, such as by degradation of crosslinking bridges in a hydrophilic material or by a conversion of originally less hydrophilic groups into more hydrophilic groups. Decreased swelling is also possible for instance due to reaction of certain functional groups in polymers with lysozyme or with other tear compounds. Although this change can be caused by various environmental factors (such as light or oxygen in case of photodegradation or oxidative degradation), the change is preferably caused by change in water content due to hydrolysis of certain functional hydrophobic groups into hydrophilic pendant or end groups in at least part of the material the lens consists of.

By "hydrophobic group" or "hydrophilic group" we mean chemical groups or structures which decrease or increase, respectively, the swelling or the solubility of the polymer in water. Such groups are not necessarily "hydrophilic" or "hydrophobic" in an absolute sense (eg. in a non-polymeric compound).

The rate and extent of the change of the lens base curve radius will determine the wear period of the lens. The question how long this period should be and how sharply this period should end is one of marketing rather than technical in nature. Generally, the wear period should not be shorter than 7 days and should not be longer than about three months. The shorter wear periods may be useful for enforcing a strict compliance by a patient, whereas the longer wear periods can be useful for prevention of gross misuse of the lens either by patient or by distributors as well as to help to reduce liability problems. Most likely, the optimum wear period will be somewhere between about two and about six weeks and this is controllable and preset in accordance with the present invention.

In the preferred embodiments wherein hydrolyzable polymers are utilized in the preparation of the lens, the hydrophobic hydrolyzable groups may be either groups on the main polymer chain or groups in the crosslinking bridges in the lens material. Either way, the hydrolysis converts them into hydrophilic groups which are either pendant or end groups of the polymer chain.

The hydrolyzable bonds in the hydrophobic groups are typically bonds between carbon and oxygen, such as in esters, lactones or anhydrides; or bonds between carbon and nitrogen, such as in amides, lactams, imides, urethanes and ureas. Other possible groupings, such as Si—O—C, Si—N—Si, Si—N—C or P—O—C, are well known to organic chemists. Such bonds are typically hydrolyzable under the moderate conditions typical for the eye surface, particularly if employed in a hydrogel. Preferred are the reactions yielding carboxylic groups for the reasons explained in some detail below.

Preferred are also groups which are hydrolyzed to hydrophilic polymer groups without releasing any low-molecular by-products. It is well known that low-molecular compounds can directly interact with cells and, therefore, can cause various health problems which are often difficult to predict. Water-insoluble polymers, on the other hand, mostly cannot penetrate the cell membranes so that their interaction with tissue is typically indirect only and much less severe and more predictable. In other words, the same functional groups are typically much less toxic on polymer than on corresponding low molecular compounds, so that it is generally safer to use chemistry in which both parent groups and resulting groups are bound to the water-insoluble polymer (such as hydrogel).

Particularly preferred are the groups which yield two or more hydrophilic groups per one initial hydrophobic group. Examples of such preferred groups are the following:

1) Glutarimide grouping (GIM) in an acrylic hydrogel chain which is converted into one carboxylate group and one amido group (both hydrophilic and attached directly to the polymer backbone) according to the reaction:

(1)

(3)

(where R is H or methyl).

2) Anhydride of pendant carboxyls in 1, 2 or 1, 3 positions which hydrolyze to yield pair of carboxylates in a close vicinity which have particularly strong effect on swelling. The hydrolysis can be described by the reaction:

(2)

where R is either H or methyl and n is 0 or 1. The above two preferred examples have hydrophobic cyclic pendant groups which are converted to pendant hydrophilic groups by plain addition of water. One hydrophobic group is converted into two hydrophilic groups on the same polymer chain and no low-molecular by-product is generated.

Some of acyclic hydrophobic pendant groups, such as esters, can be also hydrolyzed under moderate conditions typical for eye surface. These release a low-molecular by-product and generate only one hydrophilic group from each converted hydrophobic groups. In the spite of these limitations, some of these groups are useful for practicing the present invention. For instance, a pendant acetate group may be hydrolyzed under most moderately alkaline conditions to yield a vinylalcohol group and acetic acid as by-product.

It is also possible to use a hydrolyzable crosslinking agent in which one hydrophobic group is converted into two hydrophilic groups, each of which is attached to a different polymer chain.

3) For example, polymer can be crosslinked by anhydride of acrylic or methacrylic acid, which is hydrolyzed into two carboxylate groups by the reaction:

In this case the hydrolysis not only increases the hydrophilicity of the polymer, but also decreases cross-linking density at the same time so that increase in swelling per one reacted group is larger than in the previous two examples.

An advantage of the groups in the above examples is that the rate of hydrolysis depends strongly on pH so that it is relatively easy to distinguish storage conditions from wear conditions. Another advantage is that the immobilized carboxylate groups in an ionized state can catalyze very efficiently the hydrolysis of various groups on the same polymer chain in the neighborhood of the carboxylate. This way the hydrolysis is autocatalytic (ie. product catalyzes the reaction by which it is created). In addition, the immobilized carboxylates can catalyze hydrolysis of various other groups that the parent groups (amides, esters, nitriles, etc.). Most of the carboxylates bound to the polymer chain are ionized in natural eye environment due to presence of alkali metal ions (mostly sodium) and typically neutral or slightly alkaline pH of tears. This way the catalytic effect of carboxylic groups is high during the wear. On the other hand, the carboxyl ionization can be readily suppressed during storage (absence of sodium or potassium ions; slightly acidic pH; high osmolarity; replacement of water by polar organic liquids, etc.).

These advantages are not limited to the examples above but those skilled in the art can readily adapt this teaching to other polymer systems containing bonds and crosslinks derived from carboxylic groups. Such groups may be of the ester type, amide or peptide type, urethane or urea type and similarly. The art of the selective hydrolytical degradation of polymers is well known from other areas such as biodegradable drug delivery materials or surgical sutures and this technology may now be applied to the present invention lens.

It may even be an advantage to use the bonds or crosslinks preferentially degradable by enzymes present in tears so that the degradation during the wear can be made even more selective.

As is generally well known, the swelling of hydrogels will increase with increasing content of hydrophilic groups and decreasing crosslinking density. The increased swelling has several important consequences:

1) The volume of the hydrogel increases. If the swelling change is isotropic, then any linear dimension (such as base curve radius, diameter, sagittal depth, thickness, etc.) will change according to the relation:

$$(L/L_o) = (v_o/v)^{-\frac{1}{3}} \quad (4)$$

where Lo and L are general length parameters at initial and final swelling; v and vo are volume fractions of the polymer in the hydrogel at the final and initial swelling, respectively. Volume fraction of polymer can be readily calculated from liquid content if we known densities of all components involved. It is well known that proper fit of the lens on eye depends on relation of its geometry to the geometry of the particular eye. If the lens is fitting properly at the initial swelling, increased base curve radius due to the swelling will tend to deteriorate the lens fit.

2) Increased water content will change mechanical properties, in particular decreasing modulus of elasticity. The lens becomes more deformable as the result of the hydrolysis. This will tend to destabilize the lens on the eye and make its handling more difficult.

3) Refractive index of the hydrogel will decrease. At the same time, the radii of curvatures of the optical surfaces will increase due to swelling as well. Both changes will decrease the refractive power of the lens so that the initially optimum correction will deteriorate with time of wear.

If various parts of the lens change in different rates, then an optical distortion results as well. These such parts are very small (e.g. domains of varying composition within the material), then the material will become less transparent with time. This will provide a strong signal for lens exchange.

One of the advantages of our invention is that the changes in shape, consistency and optical properties do not present any hazard to the eye. On the contrary, the increased base curve radius and decreased stiffness of the lens can improve the comfort to its wearer to some extent. At the same time, the change in vision quality is moderate and gradual so that the wearer is not confronted with a sudden deterioration of his vision in some unsuitable situation.

The uniform increase in lens size and decrease in the lens stiffness and refractive power with time of wear provide a safe and gentle incentive to discard the used lens and to use a fresh one. The same change of properties with time of wear prevents also a gross misuse of the lens such as repackaging disposable contact lenses for sale as more expensive (on per unit basis) lense for continuous use.

The extent of the swelling change can be readily controlled by content of the hydrolyzable groups.

If the present invention lens is made of one material which changes uniformly with time, the base curve radius is changing according to the Equation (4) above. All other dimensions (diameter, thickness etc.) change in the same rate so that the whole lens is being scaled up due to increased swelling.

In one type of preferred embodiment of the present invention, compound lenses are comprised of two or more materials which have generally different changes in swelling due to the hydrolysis. Because the different swelling will cause different dimensional changes in each part of the lens, the lens shape will be changed more profoundly than in the case of uniform swelling. In this way, the change of base curve radius with swelling in any of the materials is steeper than predicted by the Equation (4) for a uniformly growing lens. Various dimensions of the lens can be changed independently of each other. The hydrolysis-induced change can even cause a gross shape distortion which provides a much more distinct signal for change than the gentle prodding provided by uniform growth.

Figure 1:
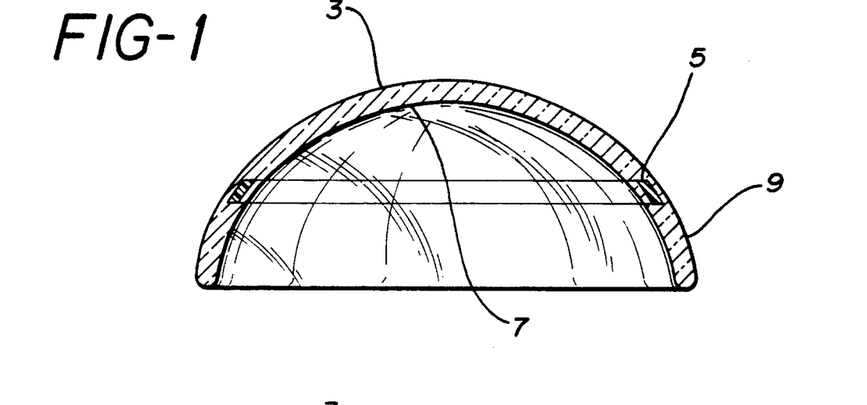
FIG. 1 illustrates a side view of a present invention soft contact lens having a non-hydrolyzable annular reinforcement, in its unswollen (unhydrolyzed) state.
Figure 2:
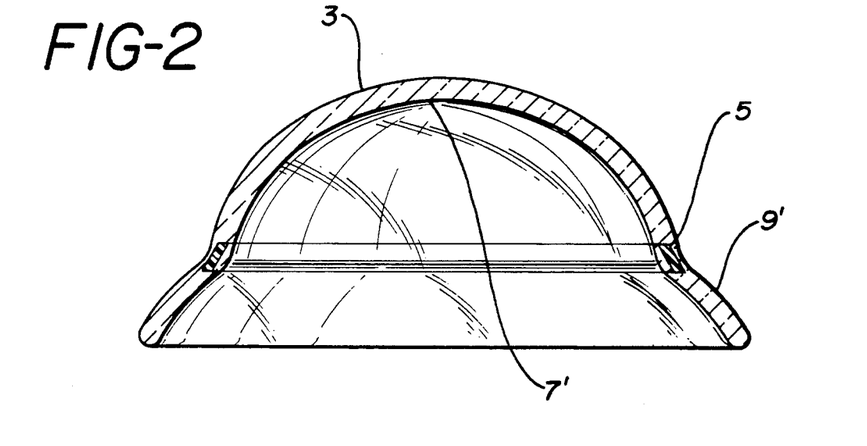
FIG. 2 shows the lens of FIG. 1 in its altered state after hydrolyzation has occurred.

The compound lenses according to the present invention can have various forms. For instance, the lens made out of the hydrolyzable hydrogel can have embedded annular reinforcement made from a non-hydrolyzable material outside the optical zone as shown in FIG. 1. Here, lens 3 has annular ring 5 and a base curve radius 7, as shown. If the hydrogel increases its swelling due to the hydrolysis, the shape of the lens changes as indicated in FIG. 2 with base curve radius 7'. The base curve radius change is much steeper than in the case of uniform swelling. Moreover, the edge configuration 9 and 9' have also changed, changing the interaction lens-eyelid.

Figure 3:
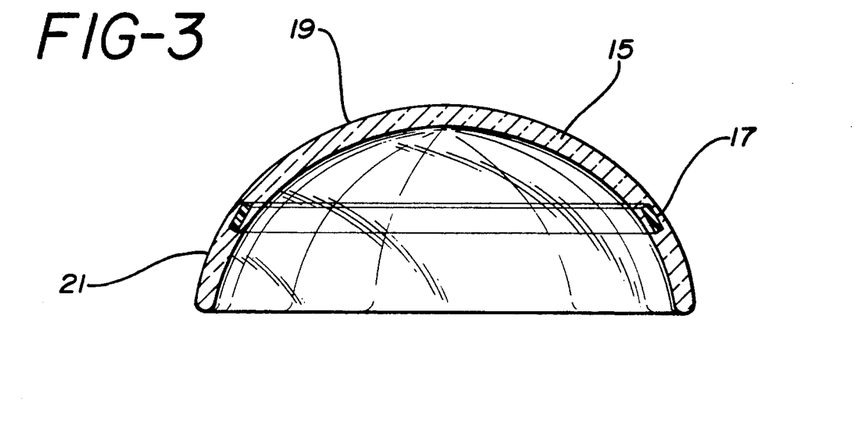
FIG. 3 shows a side view of another present invention lens with an annular reinforcement ring which is hydrolyzable but not yet hydrolyzed.
Figure 4:
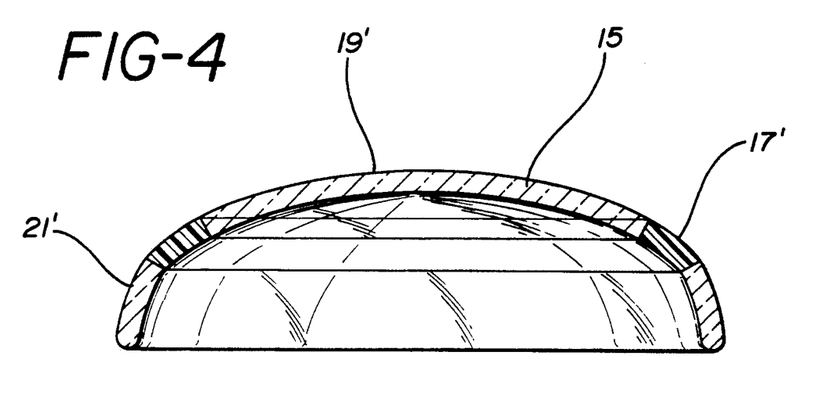
FIG. 4 shows the lens of FIG. 3 after the ring has hydrolyzed.
Figure 5:
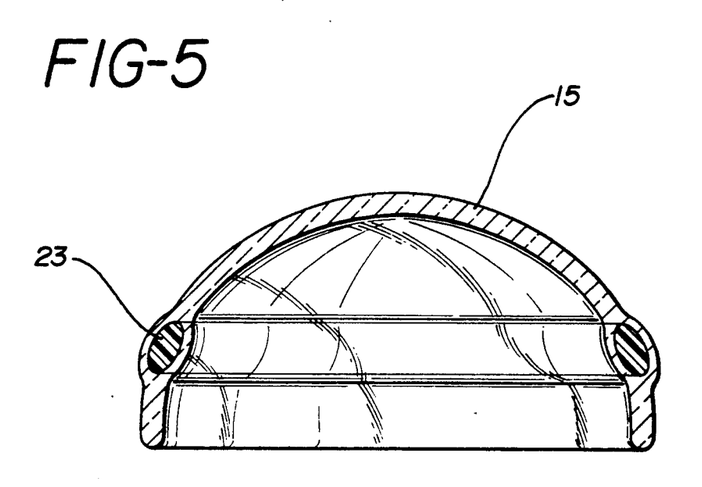
FIG. 5 illustrates the FIG. 3 lens.

Alternatively, a ring in the lens periphery may change due to the hydrolytic degradation while the rest of the lens is made of a hydrolytically stable material. In this case the lens can change its shape from the initial one as shown in FIG. 3 to the changed shape shown in FIG. 4. Referring to both Figures, lens 15 includes reinforcing ring 17 (before hydrolysis) and 17' (after hydrolysis). When ring 17 swells, the optical part 19 flattens to 19', the edge 21 gets steeper to 21' and the lens fit changes dramatically. If the ring material continues to swell (or even becomes water-soluble) due to the continuing hydrolysis, then the lens 15 becomes highly deformable as the original reinforcement ring 17 changes into a mushy material or even into a liquid-filled void 23 as shown in FIG. 5. Either way, the lens properties change, providing incentive for the lens user to exchange it for a fresh one.

If all parts of the lens swell due to hydrolysis, but the rate of swelling is different in different parts, than the size increase and shape distortion proceed simultaneously. The shape of various parts of compound lens is rather arbitrary as long as the initial lens properties are satisfactory. The non-uniform growth will always cause distortion of shape which will enforce the lens disposal. In addition to the above mentioned inserts (such as the annular ring shaped inserts discussed above), the parts with different growth may have the shape of regular segments, irregular patches and so on. The parts with different swelling may also have the shape of layers. Then the relatively small difference in swelling change in each of the layers can cause a substantial change in shape of the laminate lens (similarly as in bimetallic switches, where a small difference in thermal dilatation causes a substantial shape change).

Because the disposable lens according to the present invention has to be comfortable and physiologically acceptable lens—and preferably lens for extended wear—the high oxygen transport through the lens is essential. It is preferred, therefore, that the main material used is a hydrogel with a sufficiently high water content. In general, the initial water content should be higher than at least 50% by weight, and preferably higher than 60% by weight.

Various hydrogels with high water content are well known to those skilled in the art. Most suitable ones are based on hydrophilic derivatives of acrylic and methacrylic acid (such as hydrophilic esters or amides) and/or hydrophilic vinyl derivatives (such as vinylpyrrolidone or vinyl alcohol). Most of the hydrogels used in contact lenses today are covalently crosslinked. The covalent crosslinking can be advantageously done at least partly by the degradable crosslinking agents as mentioned before.

Particularly advantageous hydrogels with very high water content are block copolymers of polyacrylonitrile and hydrophilic derivatives acrylic acid, such as acrylamide, arylamidine or acrylic acid salts. Such hydrogels, mostly known under their trade name HYPAN (R) (Kingston Technologies, Dayton, N.J.) have excellent mechanical properties up to very high water content, such as more than 80% or even 90% of water. In addition to their outstanding mechanical properties, these hydrogels are not covalently crosslinked so that can be processed into contact lenses by various methods other than polymerization molding. One such method particularly suitable for highly reproducible and inexpensive production is described in copending patent application Ser. No. 07/411,682, entitled "Corneal Lens Implant" and filed on Sep. 25, 1989 by Vladimir A. Stoy, George P. Stoy, Alena Lovy and Francis T. Delahanty, now abandoned, the entire text and Examples being incorporated herein as reference. Other methods which are adventageous for lens molding are described in patent application Ser. No. 07/120,947, entitled "Precision Molding" and filed on Nov. 16, 1987 by Vladimir A. Stoy and George P. Stoy, now abandoned, the entire text and Examples being incorporated herein as reference.

The block hydrogels of this type can contain various hydrolyzable groups, primarily side glutarimide rings, as described, for instance, in U.S. Pat. Nos. 4,337,327, 4,329,294, 4,379,874, 4,420,589 and U.S. patent application Ser. No. 07/135,070 entitled "Method for Preparing Polyacryloniterile Copolymers by Heterogenous Reaction of Polyacryloniterile Aquagel" and filed on Dec. 12, 1987 by Jan Lovy, Vladimir A. Stoy and George P. Stoy, now U.S. Pat. No. 4,943,618 the entire text and Examples being incorporated herein as reference. The glutarimide rings are hydrophobic and stable in slightly acidic aqueous media, particularly in absence of sodium cations. Once exposed to tears (which have mostly neutral to slightly alkaline pH and contain Na), they convert slowly into pair amide-carboxylate according to the Equation (1). Therefore, their hydrophilicity and water content increase with time of wear, inducing thus change in the size and/or shape of the lens.

There are also other hydrogels with main physical crosslinking, such as polyurethanes with sufficiently long poly(ethylene oxide) segments and other hydrophilic groups. These polymers have typically good mechanical properties at high water content and good processability into various useful shapes so they are potential candidates for contact lenses with high water content in general. In particular, the urethane and/or urea bond the polymer chain is somewhat hydrolytically unstable if highly hydrophilic groups are in its vicinity. This natural tendency of polyurethane hydrogels to biodegrade can be improved by introduction of hydrolyzable groups, such as anhydride, lactone, lactame or epoxi groups. As with the other polymers, the hydrolyzable groups can be either part of the main chain or they can be cross-links of the polymer.

The requirements on consistency and reproducibility of disposable contact lenses are very high because each lens cannot be fitted individually. A useful product has to be able to be 1) Produced to exact specifications at acceptable cost;
2) Maintained to meet such specifications during storage and distribution.

The disposable lens has to be stored and distributed in a way which guarantees its safety and efficacy when it reaches the customer. Thus, the object of our invention is not only the lens which changes the size and/or shape with the time of wear, but also the disposable contact lens system comprising:

1) Contact lens changing its size and/or shape under condition of wear (due to factors such as tear composition, eye surface temperature, exposure to light and oxygen);
2) Packaging means including physiologically acceptable storage medium which prevents access of sodium and $OH^-$, of oxygen, of actinic light and so on.

The composition of the medium depends on the mechanism of the lens "self-destruction".

For the lens containing the hydrophobic hydrolyzable groups, the medium should have at least two of the following characteristics:

1) Low concentration of $OH^-$ (pH<7 and preferably 4<pH<6);
2) Absence of cations of alkali metals, particularly sodium. If the ions are needed to maintain the osmolarity (for instance, to keep the medium isotonic), the alkaline metal cations can be replaced by less metallic cations such as ammonium cation or an amine cation. Example of isotonic solution without alkali metals is aqueous solution of ammonium chloride (about 0.82% by weight).
3) Low activity of water in the lens. The lens can be kept in the package partly or fully dehydrated, or water can be replaced at least partly for an inoculous organic polar solvent plasticizing the hydrogel, such as glycerol, propylene glycol, glycerol mono- and/or diacetate, glycol monoacetate, polyethylene glycol and similarly. In this case the exposure to water is the main factor initiating the lens change at the beginning of the wear period.

EXAMPLES

The following Examples describe some of the more specific combinations. Many more basic hydrogels, reactive groups and storage systems as well as various combinations of materials, lens designs and production methods can be readily devised by those skilled in the art within the scope of our invention.

EXAMPLE 1

HYPAN-type hydrogel was made by heterogeneous reaction of polyacrylonitrile (PAN) using the process described in U.S. patent application Ser. No. 135,070 from Dec. 18, 1987, now U.S. Pat. No. 4,943,618.

The polymer in the hydrogel had the following overall composition as measured by 13C NMR:

Acrylonitrile units . . . 37 mol. %
Glutarimide units . . . 4 mol. %
(The balance are acrylamide and acrylic acid units.)

The hydrophilic micro-composite consisting of mixture of polymer chains with variable composition and structure was converted into hydrogel lens by the molding method described in U.S. patent application Ser. No. 07/120,947 from Nov. 16, 1987, now abandoned. In accordance with this method, the polymer was dissolved in 55% aqueous solution of NaSCN and filled into 2-part plastic molds. The polymer solution was then coagulated in diluted NaSCN and lenses thus formed were washed thoroughly in distilled water at pH=4.

Finally, the lenses were soaked in excess of 0.82% solution of ammonium chloride inside closed vials and autoclaved at 123° C. for 30'.

The lenses were stable in the ammonium chloride solution and at ambient temperature neither dimension nor polymer composition changed over extended periods of time.

Once put into isotonic NaCl or tears or a liquid with composition typical for tears, the water content started growing from the original 83% of liquid to more than 90% after several weeks. At the same time diameter was growing from the original 14 mm to more than 16 mm after several weeks under the wear conditions. Other dimensions, such as base curve radius, grew in a similar proportion making the lens wearable and handlable with difficulty.

The NMR analysis of the lens worn for an extended time period revealed that glutarimide units disappeared completely, nitrile groups decreased in concentration and amide and carboxylate units increased in concentration.

In addition, a small concentration of acrylamidine groups was detected.

EXAMPLE 2

Contact lens from the Example 1 is gradually soaked in 50%, 70% and 90% 1,2-propylene glycol which is then used as the storage solution instead of the isotonic ammonium chloride solution.

The lens can be sterilized in an excess of the glycol solution. The polymer chemical composition and the lens properties are substantially unchanged during extended storage in the glycol storage solution. Prior to use, the lens is rinsed and briefly equilibrate with sterile, isotonic saline.

EXAMPLE 3

The polymer from the Example 1 can be modified by acid-catalyzed reactions (described in, for instance, U.S. Pat. No. 4,369,294) so that its initial glutarimide content increases and nitrile content decreases. The modification can be carried out in such a degree that the initial hydrophilicity (and the consequent swelling in water) of both polymers is substantially equal. After the hydrolysis of GIM groups, however, the modified polymer swells substantially more than the original polymer. This uneven swelling can be utilized for change of shape of the lens during the wear.

To make such a composite contact lens with predetermined useful life, two polymers are used:

A—the polymer from the Example 1;
B—the polymer from the Example 1 modified to the following composition:
  AN units—36 mol. %
  GIM units—7.1 mol. %
(the balance are acrylamide and acrylic acid units).
C—the polymer from the Example 1 modified to the following composition:
  AN units—35 mol. %
  GIM units—12.4 mol. %
(Again, the balance are acrylamide and acrylic acid units).

Each of the polymers was dissolved in 55% aqueous solution of NaSCN to form Solution A, Solution B and Solution C, respectively, which have the same volume shrinkage upon coagulation to form Hydrogel A, Hydrogel B and Hydrogel C, respectively. The solutions are used to mold contact lenses by the process substantially described in Example 1 but modified as follows:

The Solution A is charged as a drop into the central zone of the bi-part mold, while the Solution B is charged into the mold periphery in form of a ring around the drop of the Solution A.

The mold is then closed by its convex part and a moderate pressure was applied to expel excess of the solution.

Then the polymer was coagulated within the mold as described in the Example 1.

The lens formed by the coagulation is free of distortions and is indistinguishable from a lens formed from the Solution A only.

The lenses are gradually soaked in 50% aqueous and 75% glycerol solutions. After reaching equilibrium with the 75% solutions, the excess of the solution is removed from the lens surfaces and the lenses are dried at ambient temperature and humidity. Lenses contract slightly in size but stay clear and rubbery.

The lenses are both chemically and dimensionally stable in this state for extended periods of time, and can be sterilized and packaged using usual techniques.

Upon wear, the hydration increases due to hydrolysis of glutarimide and amide groups and lens increases in size becoming less and less wearable.

The peripheral part made from Hydrogel B grows faster and to a larger degree than the central part made from the Hydrogel A. The change of the overall geometry enforces faster replacement than the isotropic change described in the Examples 1 and 2.

EXAMPLE 4

The process from the Example 3 is used to form a lens which is approximately ½ made from Hydrogel A and ½ from the Hydrogel C. The differences in the growth of both parts during the wear are making the lens less positionally stable and less wearable with increasing time of wear.

EXAMPLE 5

The process from the Example 3 can be modified in the following way: Solution C is spread onto the convex part of the mold, while Solution A is spread onto the concave part.

As both parts are combined, the lens is formed by two layers with different rate of growth during the wear. Since the inner (concave, posterior) layer made of the Hydrogel C grows more and faster than the other layer, the lens flattens progressively with the time of wear and becomes less and less positionally stable in the eye.

EXAMPLE 6

100 parts of diester-free 2-Hydroxyethyl Methacrylate (HEMA) monomer is mixed with 0.5 parts of distilled anhydride of methacrylic acid and 0.1 parts of azo-bis-butyronitrile (ABIN) and 80 parts of glycerol diacetate.

The mixture is polymerized by spin-casting in open plastic mold under nitrogen at 65 deg. C. Finished lens is left in mold (which forms part of the storage system) and enclosed in soft plastic package which contains the mold with the lens, and isotonic saline in a pouch breakable by outside pressure.

The whole package is radiation-sterilized and has practically unlimited shelf-life. Prior use, the saline-containing pouch is broken so that the lens is flooded and swells to the equilibrium.

As a special safety feature, the mold plastic is selected so that the dry xerogels adhere firmly to it. The lens cannot be removed and used prior its complete swelling. Once swelled, its anhydride crosslinks hydrolyze by a slow but predictable way, being converted to highly hydrophilic methacrylate salts. Therefore, both hydrophilicity and crosslinking density change during the wear. Consequently, the lens changes its mechanical properties, increased in size and changes its optical properties. These changes are accelerated during the wear or maintenance by increased temperature of pH changes. These changes promote a timely replacement of the lens for a fresh one.

EXAMPLE 7

This Example shows a method to make a hydrogel contact lens with alternative hydrolyzable pendant groups to illustrate how readily those skilled in the art can modify current soft contact lenses to convert them into the lens according to our invention:

Hydrogel containing 67 vol. % of saline in equilibrium is made by copolymerization of N-vinylpyrrolidone and glycidylacrylate with crosslinking by 0.8 weight % of diethyleneglycol-bis-acrylate. The polymerization can be carried out e.g. by heating with 0.15 weight % of benzoyl peroxide at 70 deg. C. under a nitrogen blanket.

The polymerization is carried out in dilution by about 30% of dioxane in a two-part plastic mold.

The finished lens is washed with distilled water and then with 75% glycerol diacetate; after water is evaporated, the lens can be packaged as in Example 6 for long periods of time under typical storage conditions.

Once the lens is in contact with tears, the hydrophobic glycidylmethacrylate component hydrolyzes slowly to highly hydrophilic glycerylmethacrylate component. Consequently, the volume of the lens increases due to increasing hydration, sending a signal to the wearer that it is time for the lens replacement.

EXAMPLE 8

The lens from the Example 7 can be modified by incorporation of a relatively rigid, dimensional stable ring into the lens (preferably into the border between optical zone and periphery of the lens). The ring can be made, for instance, from a porous plastic or a polyester fiber mash to achieve permanent contact between the hydrogel and its reinforcement The reinforcement ring turns the isotropic dimensional change during the wear into an anisotropic change (i.e. the shape change) which sends the strong signal for replacement even at moderate changes of hydrophilicity.

The fresh lens configuration is schematically depicted in FIG. 1. The lens after a prolonged time of wear is schematically depicted in FIG. 2.

What is claimed is:

1. A synthetic polymer disposable contact lens having at least one self-destruct characteristic and having a predetermined length of useful life no longer than about three months, wherein at least one part of the lens substantially changes at least one lens characteristic essential for use on the eye so as to render it unusable at the end of said useful life, said polymer composition changing with increased time of wear on the eye so as to cause said lens characteristic change.

2. The contact lens according to claim 1 wherein at least part of the lens is made of a synthetic hydrogel.

3. The contact lens according to claim 1 wherein said change of characteristics is shape of the lens.

4. The contact lens according to claim 1 wherein said change of characteristics is a change in the clarity of the lens.

5. The contact lens according to claim 1 wherein said change of characteristics is a change in the refractive power of the lens.

6. The contact lens according to claim 1 wherein said change of characteristics is increase of volume.

7. The contact lens according to claim 1 wherein said change of characteristics is increase of the water content in said hydrogel.

8. The contact lens according to claim 1 wherein said change of characteristics is increase of lens diameter.

9. The contact lens according to claim 1 wherein said change of characteristics is increase of base-curve radius.

10. The contact lens according to claim 1 wherein said change of characteristics is increase in lens deformability.

11. The contact lens according to claim 7 wherein the rate of water content increase is different in various parts of lens due to different initial polymer composition.

12. The lens according to claim 11 wherein the part of the lens with the fastest increase of water content is the lens periphery.

13. The lens according to claim 11 wherein the part of the lens with the fastest increase of water content is the optical central part.

14. The lens according to claim 11 wherein the part of the lens with the fastest increase of water content is the posterior surface layer of the lens.

15. The lens according to claim 1 wherein said change of chemical composition is hydrolysis of substantially hydrophobic groups of said polymer under conditions of wear to yield more hydrophilic groups.

16. The lens according to claim 15 wherein each of said substantially hydrophobic groups is capable of being hydrolyzed into two or more substantially hydrophilic groups.

17. The lens according to the claim 16 wherein said substantially hydrophobic groups are groups selected from the group comprising imide, anhydride, lactone, lactame, urethane, urea, ester, and amide.

18. The lens according to claim 16 wherein said substantially hydrophilic groups are selected from the group comprising carboxyl, amide, amine and hydroxyl.

19. The lens according to claim 17 wherein at least one of said hydrophobic groups is cyclic group of general formula:

where R is H or Alkyl; n is 0 or 1; and X is or O.

20. The lens according to claim 19 wherein said cyclic group is glutarimide group.

21. The lens according to claim 19 wherein said cyclic group is maleinanhydride group.

22. The lens according to claim 17 wherein said hydrophobic group is derivative of acrylic or methacrylic acid.

23. The lens according to claim 22 wherein said derivative is diacrylanhydride or dimethacrylanhydride.

24. The lens according to claim 2 wherein said hydrogel comprises of derivative(s) of acrylic or methacrylic acid.

25. The lens according to claim 24 wherein at least one of said hydrophilic derivatives is selected from the group comprising amide, carboxylate, ester of polyhydroxy compounds and amidine.

26. The lens according to claim 24 wherein said hydrogel is block copolymer comprising sequences of hydrophilic derivatives and sequences of hydrophobic derivatives of acrylic or methacrylic acid.

27. The lens according to claim 26 wherein said hydrophobic derivatives are nitriles.

28. The lens according to claim 2 wherein said hydrogel is covalently crosslinked.

29. Disposable contact lens system which comprises:
(a) a synthetic polymer disposable contact lens having at least one self-destruct characteristic and having a predetermined length of useful life no longer than about three months, wherein at least one part of the lens substantially changes at least one lens characteristic essential for use on the eye so as to render it unusable at the end of said useful life, said polymer composition changing with increased time of wear on the eye so as to cause said lens characteristic change;
(b) packaging means, including a sterile physiologically acceptable storage medium suitable for maintaining the said lens characteristic unchanged for an extended period of time.

30. The disposable contact lens system according to claim 29 wherein said storage medium is solution with pH lower than 7.

31. The disposable contact lens system according to claim 29 wherein said storage medium is solution with pH lower than 6.

32. The disposable contact lens system according to claim 29 wherein said storage medium is solution with pH lower than 5.

33. The disposable contact lens system according to claim 29 wherein said storage medium is aqueous solution of ammonium salts.

34. The disposable contact lens system according to claim 30 wherein said salt is ammonium chloride.

35. The disposable contact lens system according to claim 29 wherein said storage medium comprises a water-miscible organic compound.

36. The disposable contact lens system according to claim 35 wherein said storage medium comprises a mixture of water and said water-miscible organic compound.

37. The disposable contact lens system according to claim 36 wherein said storage medium is solution of salt of an organic amine.

38. The disposable contact lens system according to claim 35 wherein said water-miscible organic compound is selected from the group comprising glycerol, glycols, polyethylene glycols and sugars.

39. The disposable contact lens system according to claim 29 wherein at least part of the lens is made of a synthetic hydrogel.

40. The disposable contact lens system according to claim 29 wherein said change of characteristics is shape of the lens.

41. The disposable contact lens system according to claim 29 wherein said change of characteristics is a change in the clarity of the lens.

42. The disposable contact lens system according to claim 29 wherein said change of characteristics is a change in the refractive power of the lens.

43. The disposable contact lens system according to claim 29 wherein said change of characteristics is increase of volume.

44. The disposable contact lens system according to claim 40 wherein said change of characteristics is increase of the water content in said hydrogel.

45. The disposable contact lens system according to claim 29 wherein said change of characteristics is increase of lens diameter.

46. The disposable contact lens system according to claim 29 wherein said change of characteristics is increase of base-curve radius.

47. The disposable contact lens system according to claim 29 wherein said change of characteristics is increase in lens deformability.

* * * * *